H. D. MARCUS.
PERCOLATOR.
APPLICATION FILED JULY 11, 1918.
1,307,745.
Patented June 24, 1919.
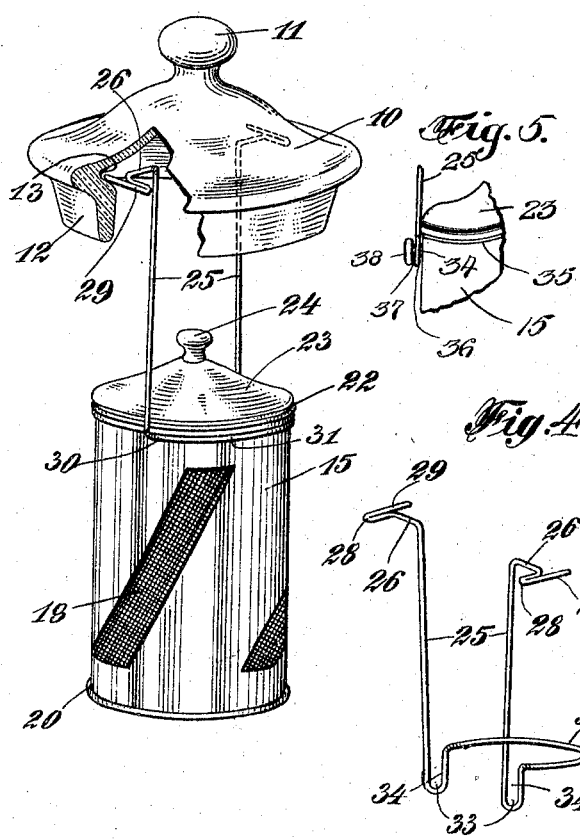
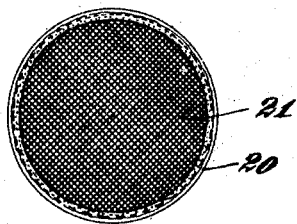
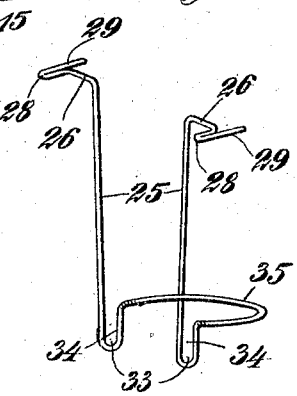
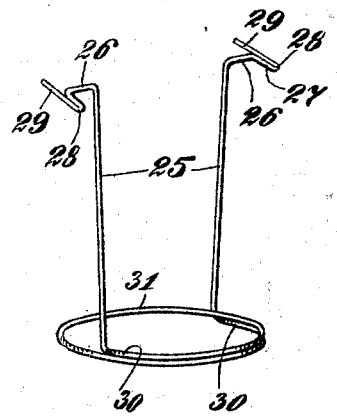
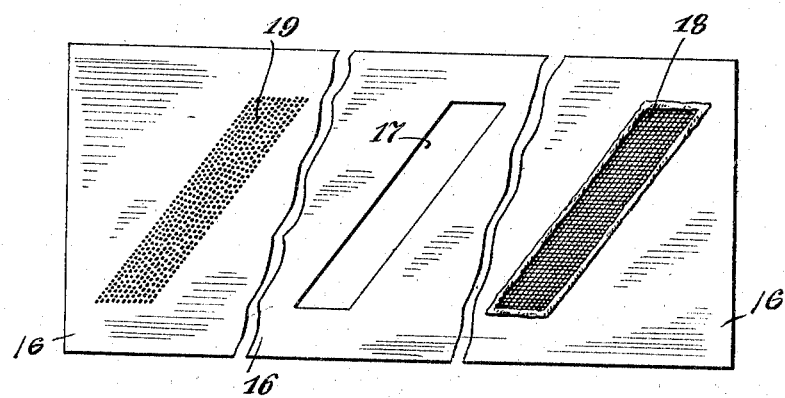
Inventor
Henry D. Marcus
By his Attorney
Eugene Pearl

UNITED STATES PATENT OFFICE.

HENRY D. MARCUS, OF PASSAIC, NEW JERSEY.

PERCOLATOR.

1,307,745.　　　　Specification of Letters Patent.　　Patented June 24, 1919.

Application filed July 11, 1918. Serial No. 244,348.

*To all whom it may concern:*

Be it known that I, HENRY D. MARCUS, a citizen of the United States, residing in Passaic, in the county of Passaic and State of New Jersey, have invented certain new and useful Improvements in Percolators, of which the following is a specification.

This invention relates to improvements in percolators of the types used in making beverages, and particularly coffee.

The principal object of the invention is to provide a convenient device which may be used in connection with an ordinary coffee pot, or like vessel, without any change in its parts and which may be attached or removed therefrom with entire facility.

A further object is to provide a device for this purpose which may be thoroughly cleansed and which may be charged with the pulverized material, of which the beverage is to be made, in a convenient manner, the contents being removed therefrom with equal ease.

A still further object is to provide a device in the form of an attachment which is relatively inexpensive and which will produce good results at a low cost.

These and other like objects are attained by the novel construction and combination of parts hereinafter described and shown in the accompanying drawing, forming a material part of this disclosure, and in which:—

Figure 1 is a perspective view showing a percolator made in accordance with the invention, and indicating its attachment to the lid of an ordinary coffee pot.

Fig. 2 is a horizontal sectional view of the percolator body looking downward.

Fig. 3 is a perspective view showing a preferred form of the device by which the percolator is attached to the vessel cover.

Fig. 4 is a similar perspective view showing a modified form of connecting element.

Fig. 5 is a fragmentary top plan view of a container provided with buttons used with the connection shown in Fig. 4.

Fig. 6 is a fragmentary plan view of the percolator body blank, developed and showing a perforate panel therein.

Fig. 7 is a similar view of a modified blank containing an oblique opening, and

Fig. 8 is a like view of the same showing the opening covered by a screen.

Referring more in detail to Fig. 1 of the drawings, there is shown a perspective view of an ordinary form of coffee pot lid or cover 10, provided with an operating knob 11, and containing within the flanged lower rim 12, an undercut annular recess 13, the same being of the most common form of construction.

The body 15 of the percolator is composed of a rectangular sheet 16, of non-corrodible metal, as aluminum, the same being formed with a plurality of diagonally disposed rhomboidal openings 17 to which may be attached upon the surface eventually forming the inner side of the cylinder, a fine meshed wire screen or netting 18, or in place of the opening 17, the material may have formed through it a plurality of fine perforations 19 in an obvious manner.

The lower edge of the sheet 16 has a beading 20, a portion of the beading extending inwardly of the cylinder, and secured thereto is a circular sheet or disk 21 of fine meshed netting, which may be made of woven wire, or a perforated plate used as preferred, the same forming the bottom of the vessel which may be seamed along the side in the common manner. The upper edge of the plate also has a beading 22, its interior being adapted to receive the downturned annular edge of a cover 23, provided with an operating knob or handle 24 so that the cover may be readily removed at any desired time.

The connecting or engaging elements, shown in Figs. 4 and 5, consist of stiff resilient wires, arranged in two substantially parallel planes 25, each having out-turned elements 26 at their ends, which are turned laterally at right angles as at 27, formed into U shaped bends 28, terminating in parallel members 29, adapted to spring outwardly and engage within the recess 13, formed in the lid 10.

The opposite ends of the wires 25 are integrally connected by bent elements 30, merging into a complete circle or band 31, adapted to make contact with the lower side of the beading 22, whereby the percolator body 15 is supported, and it will be obvious from the construction, that the attachment may be made to the lid by springing the wires 25 toward each other, permitting the extending portions 26 and 29 to enter or be removed from the annular channel within the lid in an obvious manner.

In the modification shown in Figs. 4 and 5 the connecting element is made in a similar manner except that the lower ends of the wires 25 are formed with U shaped bends 33 inclosing loops 34 from which extend the integral connecting arcuate element 35, and secured to the outer upper surface of the container body 15, at opposite disposed points, are flanges 36, having stem extensions 37, terminating in knobs or heads 38, the loops 34 of the U shaped bends being engageable with the stems 37 in a manner which will be clearly apparent.

From the foregoing it will be seen that a neat and effective device has been disclosed for the mentioned purpose and the same may be readily secured or removed from connection with the cover of the coffee-pot at any desired time, while by removing the cover 23, the material used may be entered or removed from the container body 15 in an easy and effective manner.

Having thus described my invention what I claim as new and desire to secure by Letters Patent, is:

1. A percolator comprising a hollow cylindrical body having beaded ends and perforate parallel walls, a cover engageable therewith, resilient supports engageable with said body, adjacent to one of its beaded ends, and transversely extending elements formed integrally with the free ends of said supports adapted to be resiliently engaged with a supporting means.

2. In a coffee percolator, the combination with a cylindrical metallic body beaded at the top and bottom, having a plurality of diagonally disposed openings formed therethrough, nettings disposed over said openings, a net forming the bottom of said cylindrical body, adapted to rest upon the bottom beading formed therewith, a cover for said body and resilient elements engageable below said upper beading, said elements having integrally formed outstanding members at their upper ends engageable within the lid of a coffee-pot.

3. In a percolator, the combination with a coffee-pot and a lid therefor, said lid having an annular recess formed therein, of a rigid cylindrical metallic body adapted to receive the material to be percolated, said body having perforate side walls and bottom, beadings formed in the upper and lower edges of said body, a spring wire removably engaging said body adjacent to the upper beading thereof, vertical members formed at the ends of said spring wires, and elements formed at the extremities of said members adapted to engage within the mentioned recess in the lid or be removed therefrom.

4. In a percolator, the combination with a pot having a lid containing an annular internal recess, of a body formed from a single sheet of metal, a plurality of diagonally disposed openings formed through said body, screens secured over said openings, a screen bottom secured in said body, a cover engageable with the upper portion of said body, means for operating said cover, resilient elements loosely engaging said body, parallel extending limbs formed with said engaging elements, and members integral with upper ends of said elements adapted to enter into the mentioned recess in said pot lid.

In testimony whereof I have signed my name to this specification.

HENRY D. MARCUS.

Copies of this patent may be obtained for five cents each, by addressing the "Commissioner of Patents, Washington, D. C."